United States Patent
Harashima et al.

(10) Patent No.: US 8,200,523 B2
(45) Date of Patent: Jun. 12, 2012

(54) PROCEDURE GENERATION APPARATUS AND METHOD

(75) Inventors: Ichiro Harashima, Hitachiota (JP); Koji Shiroyama, Mito (JP)

(73) Assignee: Hitachi, Ltd., Tokyo (JP)

( * ) Notice: Subject to any disclaimer, the term of this patent is extended or adjusted under 35 U.S.C. 154(b) by 818 days.

(21) Appl. No.: 12/273,727

(22) Filed: Nov. 19, 2008

(65) Prior Publication Data

US 2009/0132532 A1 May 21, 2009

(30) Foreign Application Priority Data

Nov. 19, 2007 (JP) ................................ 2007-298992

(51) Int. Cl.
*G06Q 10/00* (2012.01)
(52) U.S. Cl. ..................... 705/7.27; 705/7.11; 705/7.12; 705/7.13; 705/7.14
(58) Field of Classification Search ........ 705/7.11–7.14, 705/7.27
See application file for complete search history.

(56) References Cited

U.S. PATENT DOCUMENTS

| | | | | |
|---|---|---|---|---|
| 5,604,910 A * | 2/1997 | Kojima et al. | ......................... | 1/1 |
| 5,748,973 A * | 5/1998 | Palmer et al. | ..................... | 704/9 |
| 6,065,009 A * | 5/2000 | Leymann et al. | ...................... | 1/1 |
| 6,092,048 A * | 7/2000 | Nakaoka | ....................... | 705/7.15 |
| 6,523,026 B1 * | 2/2003 | Gillis | ..................................... | 1/1 |
| 6,546,364 B1 * | 4/2003 | Smirnov et al. | ................. | 703/22 |
| 6,571,230 B1 * | 5/2003 | Parida | .............................. | 706/48 |
| 6,772,407 B1 * | 8/2004 | Leymann et al. | .............. | 717/100 |
| 6,799,314 B2 * | 9/2004 | Beniyama et al. | ............. | 717/100 |
| 6,826,568 B2 * | 11/2004 | Bernstein et al. | .............. | 707/749 |
| 6,853,974 B1 * | 2/2005 | Akifuji et al. | ................. | 705/7.26 |
| 7,184,967 B1 * | 2/2007 | Mital et al. | .................... | 705/7.26 |
| 7,299,244 B2 * | 11/2007 | Hertling et al. | ................ | 707/694 |
| 7,533,008 B2 * | 5/2009 | Mangino et al. | .................. | 703/6 |
| 7,809,822 B2 * | 10/2010 | Gotta et al. | .................... | 709/223 |
| 7,869,984 B2 * | 1/2011 | Mangino et al. | .................. | 703/6 |

(Continued)

FOREIGN PATENT DOCUMENTS

JP          2004-126681          4/2004

OTHER PUBLICATIONS

Chroust G. et al., The role or work management in application development IBM Systems Journal, vol. 29, No. 2, 1990.*
Levine, Harvey A., Rescuing Developers from Deadline Drudgery Software Magazine; Jul 1990; vol. 10, No. 9.*

(Continued)

*Primary Examiner* — Johnna Loftis
*Assistant Examiner* — Alan S Miller
(74) *Attorney, Agent, or Firm* — Antonelli, Terry, Stout & Kraus, LLP.

(57) ABSTRACT

A procedure generation apparatus has, in a storage unit thereof, a database in which a name of input information and a name of output information name are stored, associated with a name of a work. The procedure generation apparatus retrieves one or more candidate work names associated with an input information name from the database, displays the retrieved one or more work names, receives a selection of a work name from among the displayed one or more work names, retrieves one or more candidate output information names associated with the selected work name from the database, displays the retrieved one or more output information names, receives a selection of an output information name from among the displayed output information names, retrieves one or more candidate input information names each having a similar name to the selected output information name, from the database, and displays the retrieved input information name.

19 Claims, 8 Drawing Sheets

U.S. PATENT DOCUMENTS

| | | | |
|---|---|---|---|
| 7,870,012 B2* | 1/2011 | Katz et al. | 705/7.26 |
| 2002/0032692 A1* | 3/2002 | Suzuki et al. | 707/200 |
| 2002/0078432 A1* | 6/2002 | Charisius et al. | 717/102 |
| 2002/0188597 A1* | 12/2002 | Kern et al. | 707/1 |
| 2003/0120651 A1* | 6/2003 | Bernstein et al. | 707/6 |
| 2003/0236689 A1* | 12/2003 | Casati et al. | 705/7 |
| 2004/0010505 A1* | 1/2004 | Vishnubhotla | 707/100 |
| 2004/0034857 A1* | 2/2004 | Mangino et al. | 718/104 |
| 2004/0111430 A1* | 6/2004 | Hertling et al. | 707/104.1 |
| 2004/0230636 A1* | 11/2004 | Masuoka et al. | 708/800 |
| 2004/0254768 A1* | 12/2004 | Kim et al. | 702/189 |
| 2006/0020931 A1* | 1/2006 | Clarke | 717/138 |
| 2006/0074730 A1* | 4/2006 | Shukla et al. | 705/8 |
| 2007/0162324 A1* | 7/2007 | Suzuki et al. | 705/9 |

OTHER PUBLICATIONS

Lalli, Chris, IDE introduces first software process management tool tied directly to object-oriented analysis, Business Wire, May 7, 1996.*

E. Bertino et a. A Flexible Model supporting the Specification and Enforcement of Role-based Authorizations in Workflow Management Systems Technical Report, Department of Computer Science, University of Milano, Jan. 1997.*

Yu et al., Business process modeling based on workflow model reuse, Services Systems and Services Management, vol. 2, Jun. 13-15, 2005, p. 951-54.*

* cited by examiner

FIG. 2A

23 Input information name/procedure name/output information name relational database

| Procedure name | Input information name | | | | | | Output information name | |
|---|---|---|---|---|---|---|---|---|
| 31 | | | | | 32 | | 33 | |
| Weight calculation of component A | Principal dimensions of component A | | | | | | Weight of component A | ... |
| Weight calculation of component B | Principal dimensions of component B | | | | | | Weight of component B | |
| Weight calculation of component C | Principal dimensions of component C | | | | | | Weight of component C | |
| Total weight calculation of product Z | Weight of component A | Weight of component B | Weight of component C | | | | Total weight of product Z | |
| Rotating shaft strength calculation | Total weight | Shaft diameter | Bending moment | | | | Bending stress | |
| Rotating shaft material selection | Shaft diameter | Bending stress | | | | | Rotating shaft substance | |
| ... | ... | ... | | | | | ... | |

FIG. 2B

| Procedure name | Input information name |
|---|---|
| Weight calculation of component A | Principal dimensions of component A |
| Weight calculation of component B | Principal dimensions of component B |
| Weight calculation of component C | Principal dimensions of component C |
| Total weight calculation of product Z | Weight of component A |
| Total weight calculation of product Z | Weight of component B |
| Total weight calculation of product Z | Weight of component C |
| Rotating shaft strength calculation | Total weight |
| Rotating shaft strength calculation | Shaft diameter |
| Rotating shaft strength calculation | Bending moment |
| Rotating shaft material selection | Shaft diameter |
| Rotating shaft material selection | Bending stress |
| ... | |

FIG. 2C

| Procedure name | Output information name |
|---|---|
| Weight calculation of component A | Weight of component A |
| Weight calculation of component B | Weight of component B |
| Weight calculation of component C | Weight of component C |
| Total weight calculation of product Z | Total weight of product Z |
| Rotating shaft strength calculation | Bending stress |
| Rotating shaft material selection | Rotating shaft substance |
| ... | |

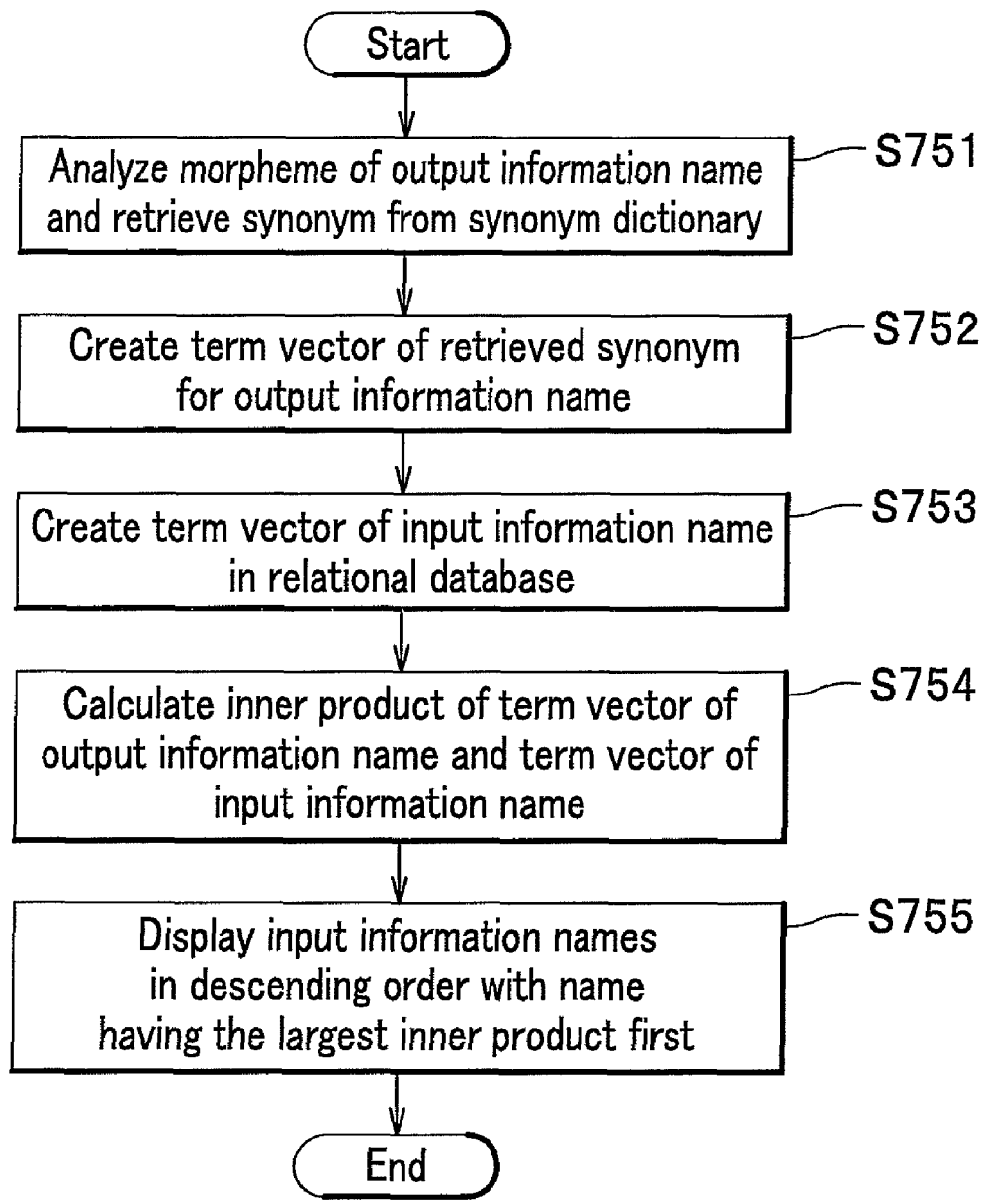

PROCEDURE GENERATION APPARATUS AND METHOD

CROSS REFERENCE TO RELATED APPLICATIONS

This application claims the benefit of Japanese Patent Application No. 2007-298992 filed on Nov. 19, 2007, the disclosure of which is incorporated herein by reference.

BACKGROUND OF THE INVENTION

1. Field of the Invention

The present invention relates to a procedure generation apparatus and a procedure generation method.

2. Description of the Related Art

There has been known a technique of guiding work procedures in a routine work such as a general business process, in which a specific work flow is defined as a premise, and then, various work procedures according to the work flow or management of an examination and approval procedure following results of conducting the work are supported.

In a commercially-available work flow management system, for example, a unit of a work called a "task" or an "activity" in a business process is represented in a form of a block. A plurality of blocks are connected with arrowed lines, which represents an anteroposterior relationship in the process. If a problem resulting from conducting a work occurs in an examination and approval procedure, the process returns to a previous procedure. This can be represented by a loop or a conditional branching.

Japanese Laid-Open Patent Application, Publication No. 2004-126681 (paragraphs 0013 to 0032 and FIG. 1) discloses a method of easily changing a work flow. In the method, an existing work flow is broken into an activity or an input/output data, which is stored in a data table and is reconstructed as appropriate.

In a nonroutine work such as designing and development of a product, however, it is not always easy to define a specific work flow which is a premise in the conventional technique. This is because cause and effect relationships between procedures in the nonroutine work are often deeply intertwined or go around in circles. For example, a result of one procedure influences another, whose result then influences yet another which is present prior to the one procedure.

Japanese Laid-Open Patent Application, Publication No. 2004-126681 has an advantageous effect on a reduction in man-hours for modifying a work flow. However, the patent application cited above is used exclusively for a routine business process and can hardly adapt to a change of a start point or of an order of procedures depending on situations, which often occurs in procedures of a nonroutine work.

To solve the problems described above, the present invention has been made in an attempt to provide a procedure generation apparatus and a procedure generation method capable of guiding work procedures and reducing the number of man-hours for creating a work flow or conducting its maintenance, even in nonroutine work procedures in which a start point or an order of procedures changes, such as designing and development of a product.

SUMMARY OF THE INVENTION

A procedure generation apparatus according to the present invention has, in a storage unit thereof, a database in which a name of input information and a name of output information are stored, associated with a name of a work. The procedure generation apparatus retrieves one or more candidate work names associated with an input information name from the database, displays the retrieved one or more work names, receives a selection of a work name from among the displayed one or more work names, retrieves one or more candidate output information names associated with the selected work name from the database, displays the retrieved one or more output information names, receives a selection of an output information name from among the displayed output information names, retrieves one or more candidate input information names each having a similar name to the selected output information name, from the database, and displays the retrieved input information name.

BRIEF DESCRIPTION OF THE DRAWINGS

FIGS. 2A to 2C are diagrams each showing an example of an input information name/procedure name/output information name relational database according to the embodiment.

FIG. 7 is a flowchart showing substeps of step S75 in the procedure of work flow creation according to the embodiment.

DETAILED DESCRIPTION OF THE EXEMPLARY EMBODIMENT

Next is described an embodiment of the present invention. The present invention is not, however, limited to the embodiment described below.

<Configuration of Hardware and Others>

Figure 1:
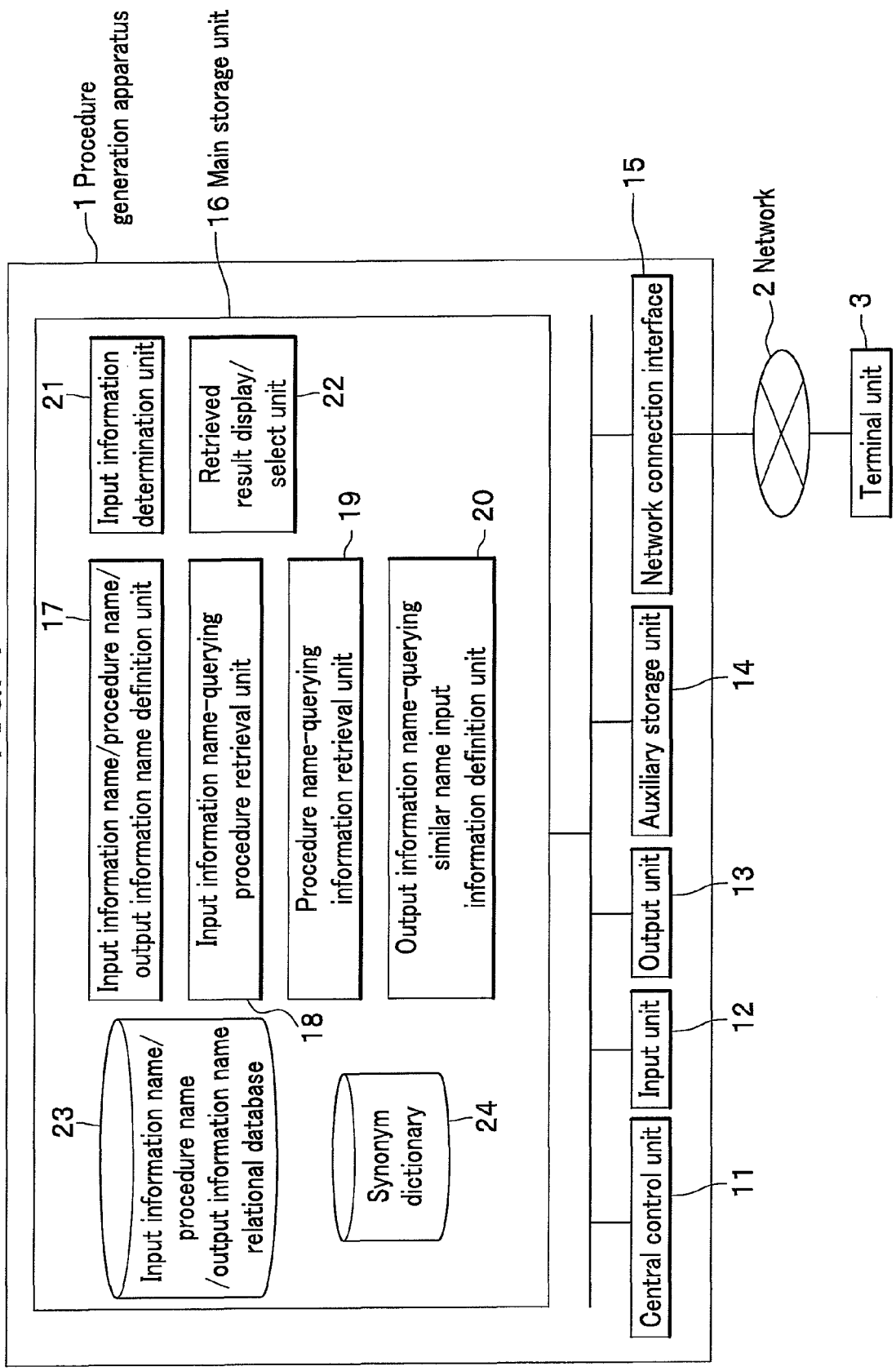
FIG. 1 is a configuration diagram showing a procedure generation apparatus according to an embodiment.

FIG. 1 shows a configuration of a procedure generation apparatus according to this embodiment.

A procedure generation apparatus 1 is a commonly-used computer. The procedure generation apparatus 1 includes a central control unit (which may be referred to as a control unit) 11, an input unit 12, an output unit 13, a main storage unit (which may be referred to as a storage unit) 16, an auxiliary storage unit (which may also be referred to as a storage unit) 14, and a network interface 15, all of which are connected to each other via a bus. The procedure generation apparatus 1 is accessible from a terminal unit 3 via a network 2. The terminal unit 3 is also a commonly-used computer. One terminal unit 3 is shown in FIG. 1, however, a plurality of the terminal units 3 may be provided. The terminal unit 3 includes a central control unit, an input unit, an output unit, a main storage unit, an auxiliary storage unit, and a network interface (all not shown), all of which are connected to each other via a bus.

The procedure generation apparatus 1 has an input information name/procedure name/output information name definition unit 17, an input information name-querying procedure retrieval unit 18, a procedure name-querying information retrieval unit 19, an output information name-querying similar name input information retrieval unit 20, an input information determination unit 21, and a retrieved result display/select unit 22.

Each of the units 17 to 22 referred to above is a program. To simplify description, it is assumed herein that the units 17 to 22 directly perform their respective functions. Actually, however, it is the central control unit 11 that reads and loads the units 17 to 22 from the auxiliary storage unit 14 into the main storage unit 16, and executes the functions written in the units 17 to 22.

The procedure generation apparatus 1 also has an input information name/procedure name/output information name relational database 23 and a synonym dictionary 24. The input information name/procedure name/output information name relational database 23 is a database in which an input information name and an output information name are stored, associated with a procedure name (to be described hereinafter). The synonym dictionary 24 is a reference database in which a synonym of the output information name is stored (to be described in detail hereinafter).

<Input Information Name/Procedure Name/Output Information Name Relational Database 23>

FIG. 2A shows an example of the input information name/procedure name/output information name relational database 23 according to this embodiment.

The input information name/procedure name/output information name relational database 23 (which may also be referred to as a relational database or, simply, a database) stores, associating with a procedure name stored at a procedure name 31 in FIG. 2A, the input information name at an input information name 32 and an output information name at an output information name 33.

The procedure name is composed of a character or characters representing contents of a given procedure and may also be referred to as a work name.

The input information name is composed of a character or characters representing information to be inputted as necessary for conducting the procedure.

The output information name is composed of characters representing information generated and outputted by conducting the procedure.

The number of the input information names associated with one procedure name may be one or more. The number of the output information names associated with the one procedure name may also be one or more. The number of the input information names associated with a given procedure name may be or may not be the same as the number of the output information name associated with the same procedure name. The numbers of a plurality of input information names associated with respective procedure names may be or may not be the same. The number of a plurality of output information names may be or may not be the same as the number of respective procedure names associated with the plurality of output information names.

In FIG. 2A, for example, data in line 4 indicates the following: 1) A procedure with a procedure name of "total weight calculation of product Z" is performed; 2) To perform the procedure, three pieces of information with respective input information names of "weight of component A", "weight of component B", and "weight of component C" are necessary and to be inputted; and 3) After the procedure is performed, a piece of information having an output information name of "total weight of product Z" is generated and outputted.

An input (or output) information name associated with a procedure name may by chance coincide with another input (or output) information name associated with another procedure name. For example, in FIG. 2A, a "shaft diameter" is an input information name with a procedure name of a "rotating shaft strength calculation" and is also an input information name with a procedure name of a "rotating shaft material selection".

An output (or input) information name associated with a procedure name may by chance coincide with another output (or input) information name associated with another procedure name. For example, in FIG. 2A, "weight of the component A" is an output information name with a procedure name of "weight calculation of the component A" and is also an input information name with a procedure name of "total weight calculation of the product Z".

The relational database 23 may be divided into two as shown in FIG. 2B and FIG. 2C. In FIG. 2B, the relational database 23 stores therein, associating with a procedure name stored at a procedure name 34, an input information name at an input information name 35. In FIG. 2C, the relational database 23 stores therein, associating with a procedure name stored at a procedure name 36, an output information name at an output information name 37.

<Operation Screen 40>

Figure 3:
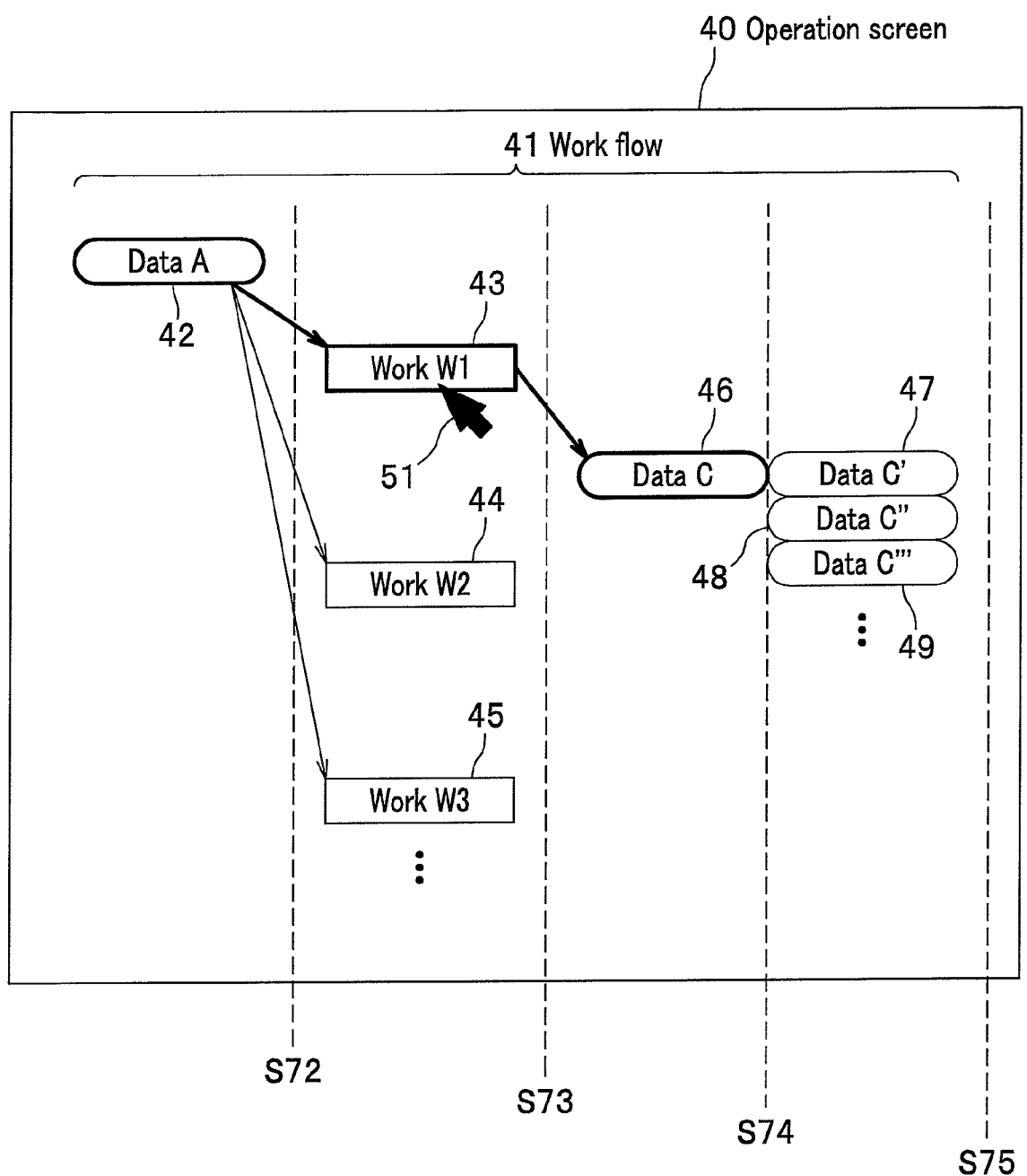
FIG. 3 is a diagram showing an example of an operational screen displayed on an output unit by a retrieved result display/select unit according to the embodiment.

FIG. 3 shows an example of an operation screen 40 displayed on the output unit 13 by the retrieved result display/select unit 22 in this embodiment. The operation screen 40 displays a work flow 41 in a tree structure.

Rectangular nodes (a node herein is shown as a graphic) designated at reference numerals 43, 44, and 45 are Works W1, W2, and W3, respectively. Works W1, W2, and W3 correspond to the procedure names in FIG. 2A. Oval nodes in thick line designated at reference numerals 42 and 46 are Data A and Data C, respectively. Data A (an origin of arrows extending to respective Works W1, W2, and W3 corresponding to the procedure names) corresponds to the input information name in FIG. 2A. Data C (a destination of an arrow extending from Work W1 corresponding to the procedure name) corresponds to the output information name in FIG. 2A. Oval nodes in thin line designated at reference numerals 47, 48, and 49 are Data C', Data C'', and Data C'''. Data C', Data C'', and Data C''' are synonyms (including identical words) of Data C shown at the input information name 32 of FIG. 2A (to be described later in detail) Reference numeral 51 indicates a pointer operated by the input unit 12 such as a mouse.

How the work flow 41 is displayed in phases from left to right on the operation screen 40 as shown in FIG. 3 will be described later.

Figure 4:
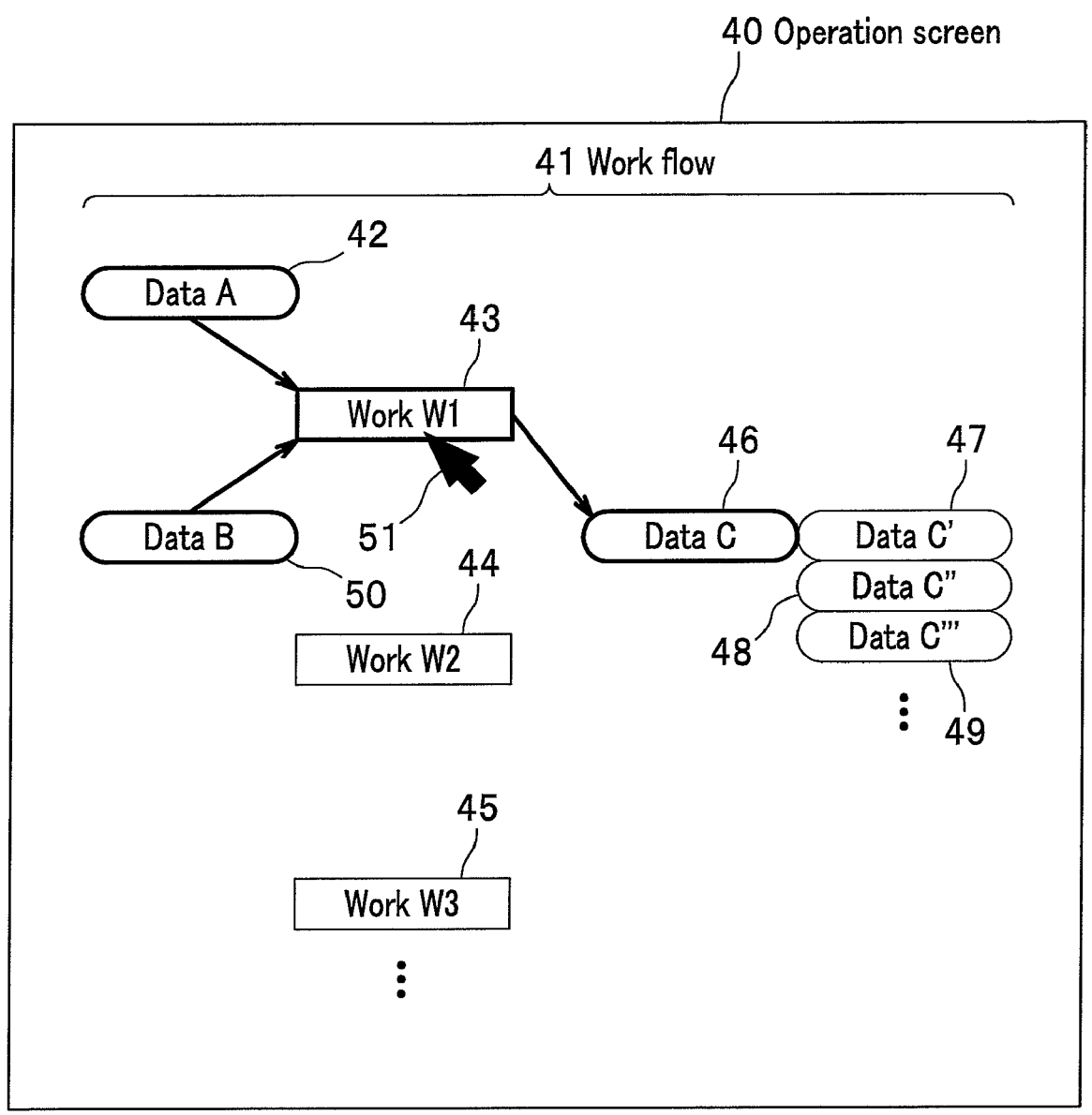
FIG. 4 is a diagram showing another example of the operational screen displayed on the output unit by the retrieved result display/select unit according to the embodiment.

FIG. 4 shows another example of the operation screen 40 displayed on the output unit 13 by the retrieved result display/select unit 22 in this embodiment.

If Work W1 43 is selected with the pointer 51, the input information name-querying procedure retrieval unit 18 uses the procedure name as a query and retrieves the relational database 23 using Work W1 as a retrieval key. The input information name-querying procedure retrieval unit 18 then acquires an input information name which has the procedure name of Work W1, other than Data A. (It is assumed herein that the input information name-querying procedure retrieval unit 18 also has a function of acquiring a data, serving more than its name indicates.) The retrieved result display/select unit 22 then displays the acquired input information name. FIG. 4 shows Data B 50 as an example of the acquired input information name. Operations mentioned above allow a user to confirm all of the input information necessary to perform a procedure of Work W1.

As described above, in this embodiment, nodes can be displayed on the operation screen 40 in an order of the input information name, procedure name, and output information name. In addition, the nodes can be displayed in a reverse order to the above, namely, the output information name, procedure name, and input information name. Moreover, nodes in any number of prescribed rows can be displayed in relation to a node selected by the user. For example, the user selects a node and then selects the number of rows to be displayed at a column rightward or leftward of the selected node.

<Procedures>

Next are described procedures according to this embodiment. The procedures include a procedure of relational database creation and a procedure of work flow creation. The procedure of work flow creation is performed only after the procedure of relational database creation is completed.

<Procedure of Relational Database Creation>

Figure 5:
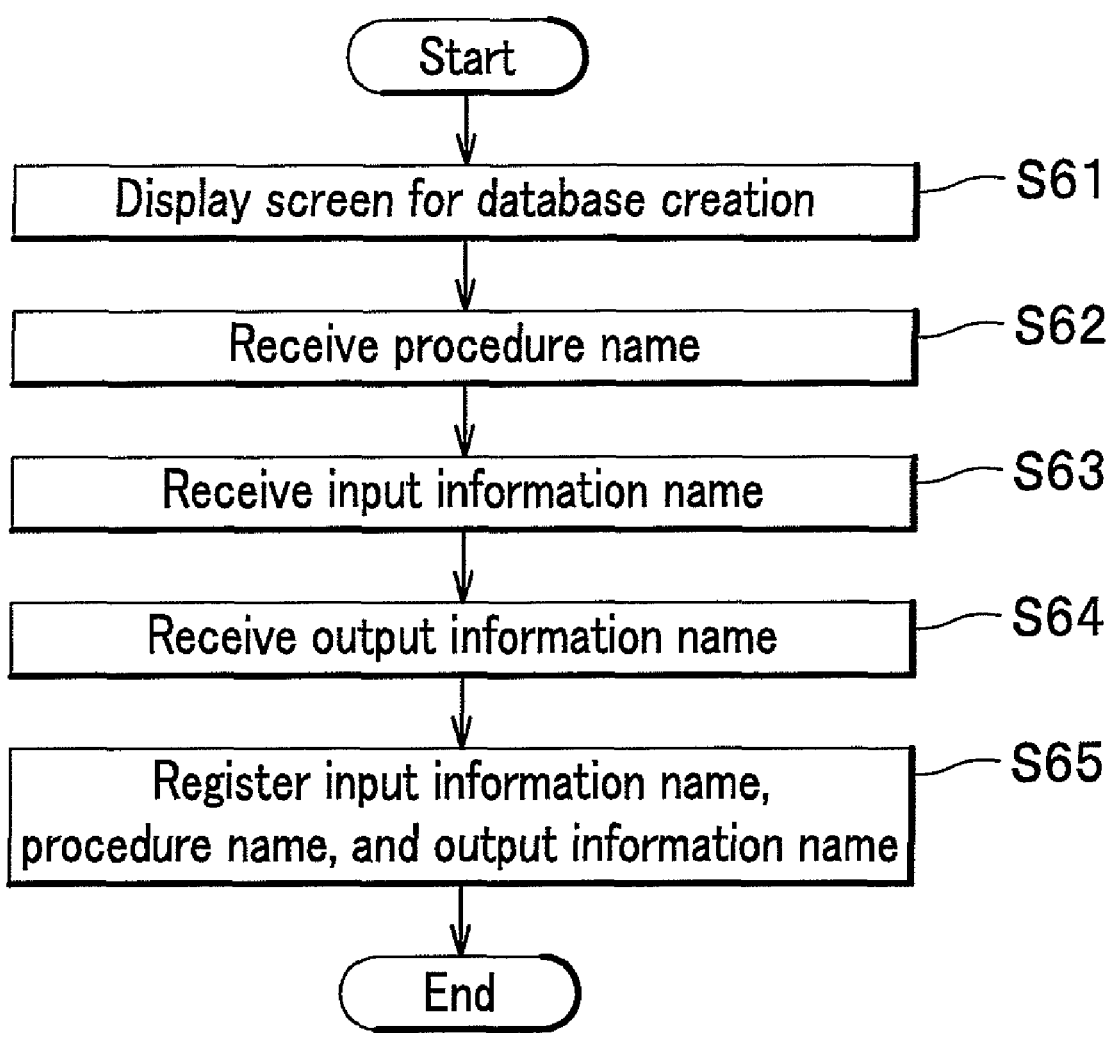
FIG. 5 is a flowchart showing a procedure of relational database creation according to the embodiment.

FIG. 5 is a flowchart showing the procedure of relational database creation according to this embodiment. The relational database 23 is created in the procedure prior to creating the work flow 41 on a screen.

In step S61, the input information name/procedure name/output information name definition unit 17 displays a screen for creating a relational database.

More specifically, the input information name/procedure name/output information name definition unit 17 responds to a click of a relational database creation button (not shown) on the output unit 13, which is performed by a user via the input unit 12 such as a mouse, and then displays the relational database creation screen. It is assumed herein that FIG. 2A is displayed as the relational database creation screen.

In step S62, the input information name/procedure name/output information name definition unit 17 receives a procedure name.

More specifically, the name definition unit 17 receives an input of the procedure name by the user via the input unit 12 such as a keyboard.

In step S63, the input information name/procedure name/output information name definition unit 17 receives one or more input information names.

More specifically, the name definition unit 17 receives an input of the one or more input information names by the user via the input unit 12 such as a keyboard, associating with the procedure name received in step S62.

In step S64, the input information name/procedure name/output information name definition unit 17 receives one or more output information names.

More specifically, the name definition unit 17 receives an input of the one or more output information names by the user via the input unit 12 such as a keyboard, associating with the procedure name received in step S62.

In step S65, the input information name/procedure name/output information name definition unit 17 registers the input information name, procedure name, and output information name.

More specifically, the name definition unit 17 stores the input information name and the output information name inputted in step S63 and S64, respectively, associating the input and output information names with the procedure name, in the relational database 23. This terminates the procedure of relational database creation.

It is to be noted that steps S62 to S64 may be conducted in any order. Further, instead of receiving a manual input by a user according to the aforementioned procedure of relational database creation, the input information name/procedure name/output information name definition unit 17 may receive an input of the relational database 23 previously inputted and stored in a recording medium, via the input unit.

<Procedure of Work Flow Creation>

Figure 6:
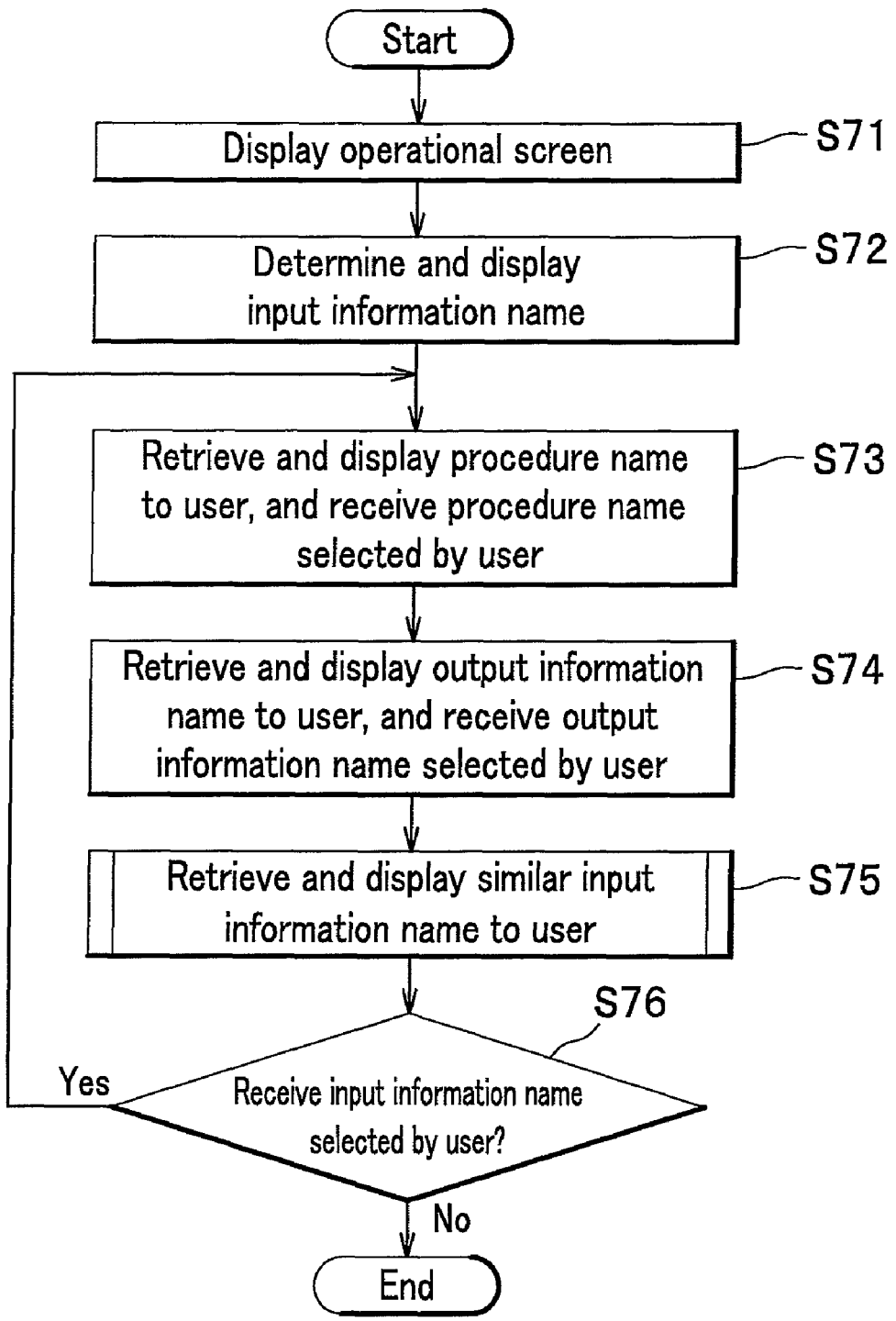
FIG. 6 is a flowchart showing a procedure of work flow creation according to the embodiment.

FIG. 6 is a flowchart showing a procedure of work flow creation according to this embodiment. The work flow 41 is created on a screen in the procedure.

<Determination of Input Information Name and Others>

The procedure of work flow creation begins with either an input of the input information name or the procedure name which is performed by a user.

An input information name may be inputted directly or may be selected from among the input information names stored in the relational database 23. Further, an input information name may be selected from a plurality of candidate input information names. In the latter case, the number of the candidates is narrowed down using a retrieval key composed of characters or using some specific characters. Herein, the selection of one input information name is referred to as a determination of the input information name. Similarly, one procedure name is determined in the procedure.

A user tends to have a difficulty in newly thinking of the input information name to start the procedure of work flow creation. In this embodiment, however, the procedure can be started off with an easy determination of the input information name. For example, below is a description making use of a difference between a specification requested by a customer and that of an existing product.

It is assumed herein that the customer requests a specification of a product by order, for example, with a horsepower of 100 hp, a weight of 1000 kg, and a noise of 70 dB. A user inputs an item "horsepower", its requested numerical values, and so on, via the input unit 12.

It is also assumed that a specification of an existing product of the same type as the product by order is known to have the horsepower of 90 hp, the weight of 950 kg, and the noise of 70 dB, and those data are stored in the main and auxiliary storage units 14, 16.

Then, the input information determination unit 21 calculates a rate of deviation of the values for each specified items of the ordered product relative to those of the existing product. The calculation finds that the item "horsepower" has the largest rate of deviation ($(100-90)/90=11.1\%$), which determines the item "horsepower" as the input information name. Alternatively, the item "noise" having the smallest rate of deviation may be determined as the input information name.

In step S71, the retrieved result display/select unit 22 displays the operation screen 40 (see FIG. 3).

More specifically, the retrieved result display/select unit 22 displays the operation screen 40 in response to a click of a work flow creation button (not shown) on the output unit 13 by the user via the input unit 12 such as a mouse.

It is to be noted that, after step S71 is completed, the work flow 41 is not yet displayed on the operation screen 40. Four vertical dotted lines in FIG. 3 show that the work flow 41 is displayed from a leftmost part to the respective dotted lines after steps S72 to S75 are completed, respectively.

In step S72, the input information determination unit 21 determines and displays the input information name.

More specifically, the input information determination unit 21 determines the input information name in any of the ways described above.

Then the input information determination unit 21 displays the determined input information name on the operational screen 40 (see a node of Data A 42 in FIG. 3).

In step S73, the procedure generation apparatus 1 retrieves and displays the procedure name to the user, and receives a selection of the procedure name by the user.

More specifically, in a first substep of step S73, the input information name-querying procedure retrieval unit 18 retrieves the relational database 23 using the input information name determined in step S72 or the input information name received in step S76 (if "Yes" in step S76) as a retrieval key and acquires all the procedure names retrieved by the retrieval key.

In a second substep, the retrieved result display/select unit 22 displays all the procedure names acquired in the first step on the operational screen 40 (see nodes of Works W1 to W3 43 to 45 in FIG. 3).

In a third substep, the retrieved result display/select unit 22 receives the procedure name selected by the user via the input unit 12 from among the procedure names displayed in the second substep. A selection of the procedure name may be made by operating the input unit 12, for example, by placing the pointer 51 over a desired node and clicking a mouse there (selections hereinafter the same). After the selection, only the selected node may be displayed or highlighted.

In step S74, the procedure generation apparatus 1 retrieves and displays the output information name to the user, and receives a selection of the output information name by the user.

More specifically, in a first substep of step S74, the procedure name-querying procedure retrieval unit 19 retrieves the relational database 23 using the procedure name determined in the third substep of step S73 as a retrieval key and acquires all the output information names retrieved by the retrieval key.

In a second substep, the retrieved result display/select unit 22 displays all the output information names acquired in the first step on the operational screen 40 (see a node of Data C 46 in FIG. 3, which alone is retrieved in this case).

In a third substep, the retrieved result display/select unit 22 receives the output information name selected by the user via the input unit 12 from among the output information names displayed in the second substep. After the selection, only the selected node may be displayed or highlighted.

In step S75, the procedure generation apparatus 1 retrieves and displays a name similar to the input information name to the user.

Details of this step will be described later.

<Similar Name>

In steps S72 to S74, the procedure generation apparatus 1 displays a series of nodes (which may also be collectively referred to as a unit) from the input information name through the procedure name to the output information name, to the user. Such a unit allows the user to precisely know the input information name required to conduct a work and the output information name created and outputted after conducting the work.

A user generally requests a further display of the unit until the user finds all desired information in the displayed output information name. One unit and a subsequent unit thereto are desirably linked to each other with an identical information name for an accurate linkage. That is, the output information name of one unit is desirably identical to the input information name of a subsequent unit thereto. However, even if two units are not linked with the identical information name, a pseudo linkage with similar information names is also useful. In some cases, two information names are apparently different but have very similar contents. Or, information on an output information name in one unit may be manually processed, to thereby create certain information on an input information name in a subsequent unit thereto.

In step S75, the procedure generation apparatus 1 thus retrieves and displays a name similar to the input information name so as to enable such a pseudo linkage.

In step S76, the retrieved result display/select unit 22 receives a determination whether a selection of the input information name is accepted or not.

More specifically, if the retrieved result display/select unit 22 receives the selection made by the user from among the input information names displayed in step S75 (if "Yes" in step S76), the procedure returns to step S73. After the selection, only the selected node may be displayed or highlighted. Alternatively, if the retrieved result display/select unit 22 receives a click of a quit button (not shown) made by the user via the input unit 12 (if "No" in step S76), the procedure of work flow creation terminates.

<Procedure Beginning with Determination of Procedure Name>

The aforementioned procedure of work flow creation begins with the determination of the input information name. However, the procedure may begin with a determination of the procedure name as previously stated.

The latter case is similar to the former except two points as follows. First, step S72 is omitted. And second, if "No" in step S73, the input information name-querying procedure retrieval unit 18 determines the procedure name, instead of performing the first to third substeps of step S73. It is assumed herein that the input information name-querying procedure retrieval unit 18 also has a function of determining the procedure name, serving more than its name indicates. Then, the retrieved result display/select unit 22 displays the determined procedure name. Meanwhile, if "Yes" in step S76 and the procedure returns to step S73, there is no change in step S73.

<Retrospective Display of Input Information Name>

At any time after the user selects the procedure name in step S73, the input information name that is associated with the procedure name but is not presently displayed (for example, a node of Data B 50 in FIG. 4) can be displayed. The display is realized by receiving a selection of a node indicating the procedure name on the operational screen 40. The selection may be made different from the aforementioned selection for retrieving the output information name and may be performed by, for example, clicking a right mouse button.

<Display in Order of Frequency so Far Selected>

In steps S73, S74 and S75 in the procedure of work flow creation, the retrieved result display/select unit 22 can display the retrieved procedure name, output information name, and similar input information name in descending order of frequency, that is, how many times each of those names is selected so far. More specifically, each time a selection of those names by the user is received in steps S73, S74 and S76, the numbers of selections by those names are counted and recorded. Thus, if there is, for example, a plurality of the procedure names to be displayed, the procedure names can be displayed in descending order placing a procedure name having the largest number first. This facilitates the user to make a selection.

<Substeps of Step S75 in Procedure of Work Flow Creation>

FIG. 7 is a flowchart of substeps of step S75 in the procedure of work flow creation.

In step S751, the output information name-querying similar name input information retrieval unit 20 analyzes morpheme of the output information name and retrieves a synonym of the morphologically-analyzed output information name from a synonym dictionary 24.

More specifically, the output information name-querying similar name input information retrieval unit 20 analyzes morpheme of the output information name received in the third substep of step S74. It is assumed herein that the output information name is broken down into a plurality of constituent words.

For example, the output information name "rotating shaft material" is broken into three constituent words, "rotating", "shaft" and "material".

The synonym dictionary 24 is then retrieved by each of the constituent words as a retrieval key to obtain a synonym (including an identical word) thereof. Any number of synonyms to be obtained by each retrieval key can be set. For example, if two synonyms by each retrieval key are set to be obtained, "rotating" and "rotary" are obtained by the retrieval key "rotating"; "shaft" and "axis", by "shaft"; and "material" and "substance", by "material".

In step S752, the output information name-querying similar name input information retrieval unit 20 creates a term vector of the synonym.

More specifically, the output information name-querying similar name input information retrieval unit 20 combines the synonyms obtained in step S751. This creates eight (2×2×2) synonyms of the output information name such as "rotating shaft material", "rotating shaft substance", "rotating shaft material", "rotating axis material", and the like.

Then the output information name-querying similar name input information retrieval unit 20 creates a term vector of each of the created eight synonyms.

In step S753, the output information name-querying similar name input information retrieval unit 20 creates a term vector of the input information name in the relational database 23.

More specifically, the output information name-querying similar name input information retrieval unit 20 analyzes morpheme of all the input information names stored in the relational database 23 and creates term vectors thereof. For example, FIG. 2A shows that eleven input information names are stored at the input information name 32, and eleven term vectors corresponding thereto are created.

In step S754, the output information name-querying similar name input information retrieval unit 20 calculates an inner product of the term vector.

More specifically, the output information name-querying similar name input information retrieval unit 20 calculates an inner product of the term vector created in step S752 and the term vector created in step S753. As a result, 8×11 inner products are obtained.

In step S755, the output information name-querying similar name input information retrieval unit 20 displays the input information names in descending order of inner products.

More specifically, the output information name-querying similar name input information retrieval unit 20 displays, on the operational screen 40, the input information names subjected to the calculation of inner products in step S754 in descending order placing the procedure name having the largest inner product first. The number of the input information names displayed may be set in advance.

Completion of step S755 terminates step S75 in the procedure of work flow creation, and the procedure advances to step S76.

The procedure of relational database creation and the procedure of work flow creation may be performed by a plurality of users in parallel or intermittently, via the input and output units 12, 13 of the procedure generation apparatus 1 and input and output units (not shown) of the terminal unit 3.

The embodiment according to the present invention has been explained as aforementioned. However, the embodiment of the present invention is not limited to the explanation, and those skilled in the art ascertain the essential characteristics of the present invention and can make various modifications and variations to the present invention to adapt it to various usages and conditions without departing from the spirit and scope of the claims.

The invention claimed is:

1. A procedure generation apparatus for generating a work flow which is a procedure sequentially representing a relation between a name of a work to be conducted, a name of an input information required for conducting the work, and a name of an output information generated as a result of conducting the work, comprising:
   a storage unit having a database which stores therein the input information name and the output information name, associated with the work name; and
   a control unit for generating the work flow sequentially, the control unit being configured to perform operations including:
      retrieving, upon setting an input information name as a start point of the work flow, one or more work names associated with the set input information name, from the database,
      displaying the one or more retrieved work names, each as a name of a candidate work to be conducted, based on the set input information, on a display unit,
      receiving a selection of a work name from among the one or more displayed work names, via an input unit,
      retrieving one or more output information names associated with the selected work name, from the database,
      displaying the one or more retrieved output information names, each as a name of candidate output information generated as a result of conducting the work, on the display unit,
      receiving a selection of an output information name from among the one or more displayed output information names, via the input unit,
      breaking down the selected output information name into one or more constituent words and obtaining a word having a character string or a meaning same as or similar to the constituent word, as a synonym from a synonym dictionary, and creating a first term vector of each combination made up of the synonyms of the constituent words,
      breaking down all of the selected output information names into one or more constituent words, and creating a second term vector of each broken down output information name,
      calculating an inner product of the first term vector and the second term vector, and obtaining a prescribed number of the input information names subjected to the calculation of inner products, in descending order placing the procedure name having the largest inner product first,
      displaying the one or more obtained input information names, each as a name of candidate input information required for conducting the work, on the display unit,
      receiving a selection of an input information name from among the one or more displayed input information names, via the input unit, and
      retrieving a work name associated with the selected input information name, from the database;
   wherein the storage unit and the control unit are constructed at least in part, of hardware.

2. The procedure generation apparatus according to claim 1,
   wherein the control unit determines the input information name by: receiving an input of a character indicating information concerning the input information name via the input unit, and retrieving and acquiring one or more candidate input information names from the database by the received character as a retrieval key, or acquiring one or more candidate input information names stored in the database; displaying the acquired one or more candidate input information names on the display unit; and receiving a selection of an input information name from among the displayed one or more input information names via the input unit, and wherein the control unit sets the determined input information name as the start point of the work flow.

3. The procedure generation apparatus according to claim 1, wherein the storage unit pre-stores a standard attribute value concerning the input information, associated with the input information name, and wherein the control unit receives an input of an attribute value concerning a candidate input information name as the start point of the work flow, via the input unit, calculates a difference between the received attribute value and the pre-stored attribute value for each of the input information, determines the input information name as the start point of the work flow, based on the difference, and sets the determined input information name as the start point of the work flow.

4. The procedure generation apparatus according to claim 1, wherein the control unit receives a selection of a work name from among the one or more displayed work names via the input unit, and displays an input information name which is not displayed among one or more input information names associated with the selected work name, on the display unit.

5. The procedure generation apparatus according to claim 1, wherein the retrieved one or more work names and output information names are displayed on the display unit in descending order of frequency so far selected.

6. The procedure generation apparatus according to claim 1, wherein the selected input information name, work name, and output information name are highlighted on the display unit, compared to any other names that are not selected.

7. The procedure generation apparatus according to claim 1, wherein the retrieved one or more input information names are displayed on the display unit, in descending order of similarity to the output information name having been used for retrieving the one or more input information names.

8. A procedure generation apparatus for generating a work flow which is a procedure sequentially representing a relation between a name of a work to be conducted, a name of an input information required for conducting the work, and a name of an output information generated as a result of conducting the work, comprising:

a storage unit having a database which stores therein the input information name and the output information name, associated with the work name; and a control unit for generating the work flow sequentially, the control unit being configured to perform operations including:

receiving an input of a character indicating information concerning the work name as a start point of the work flow, via the input unit, retrieving and acquiring one or more candidate input information names from the database by the received character as a retrieval key, or acquiring one or more candidate work names stored in the database, displaying the acquired one or more candidate work names on the display unit, receiving a selection of a work name from among the one or more displayed work names, via an input unit, retrieving one or more output information names associated with the selected work name, from the database, displaying the one or more obtained output information names, each as a name of candidate output information generated as a result of conducting the work, on the display unit, receiving a selection of an output information name from among the one or more displayed output information names, via the input unit, breaking down the selected output information name into one or more constituent words and obtaining a word having a character string or a meaning same as or similar to the constituent word, as a synonym from a synonym dictionary, and creating a first term vector of each combination made of the synonyms of the constituent words, breaking down all of the selected output information names into one or more constituent words and creating a second term vector of each broken down output information name, calculating an inner product of the first term vector and the second term vector, and obtaining a prescribed number of the input information names subjected to the calculation of inner products in descending order, placing the procedure name having the largest inner product first, displaying the one or more obtained input information names, each as a name of candidate input information required for conducting the work, on the display unit, receiving a selection of an input information name from among the one or more displayed input information names, via the input unit, retrieving one or more work names associated with the selected input information name, from the database, displaying the one or more retrieved work names, each as a name of a candidate work to be conducted associated with the input information, on the display unit, and receiving a selection of a work name from among the displayed one or more work names;

wherein the storage unit and the control unit are constructed at least in part, of hardware.

9. The procedure generation apparatus according to claim 8, wherein the control unit receives a selection of a work name from among the one or more displayed work names, via the input unit, and displays an input information name which is not displayed among one or more input information names associated with the selected work name, on the display unit.

10. The procedure generation apparatus according to claim 8,
wherein the retrieved one or more work names and output information names, are displayed on the display unit in descending order of frequency so far selected.

11. The procedure generation apparatus according to claim 8,
wherein the selected input information name, work name, and output information name are highlighted on the display unit, compared to any other names that are not selected.

12. The procedure generation apparatus according to claim 8,
wherein the retrieved one or more input information names are displayed on the display unit in descending order of similarity to the output information name used for retrieving the one or more input information names.

13. A computer-implemented procedure generation method using a computer for generating a work flow which is a procedure sequentially representing a relation between a name of a work to be conducted, a name of an input information required for conducting the work, and a name of an output information generated as a result of conducting the work, the computer-implemented procedure generation method comprising:
storing in a storage unit, a database which stores therein the input information name and the output information name, associated with the work name; and
effecting, via a control unit of the computer, operations for generating the work flow sequentially, including:
retrieving, upon setting an input information name as a start point of the work flow, one or more work names associated with the set input information name from the database,
displaying the one or more retrieved work names, each as a name of a candidate work to be conducted, based on the set input information, on a display unit,
receiving a selection of a work name from among the one or more displayed work names, via an input unit,
retrieving one or more output information names associated with the selected work name, from the database,
displaying the one or more retrieved output information names, each as a name of candidate output information generated as a result of conducting the work, on the display unit,
receiving a selection of an output information name from among the one or more displayed output information names via the input unit,
breaking down the selected output information name into one or more constituent words and obtaining a word having a character string or a meaning same as or similar to the constituent word, as a synonym from a synonym dictionary, and creating a first term vector of each combination made of the synonyms of the constituent words,
breaking down all of the selected output information names into one or more constituent words and creating a second term vector of the each broken down output information name,
calculating an inner product of the first term vector and the second term vector, and obtaining a prescribed number of the input information names subjected to the calculation of inner products in descending order, placing the procedure name having the largest inner product first,
displaying the one or more obtained input information names, each as a name of candidate input information required for conducting the work, on the display unit,
receiving a selection of an input information name from among the one or more displayed input information names, via the input unit, and
retrieving a work name associated with the selected input information name, from the database.

14. The computer-implemented procedure generation method according to claim 13,
wherein the control unit of the computer determines the input information name by: receiving an input of a character indicating information concerning the input information name via the input unit, and retrieving and acquiring one or more candidate input information names from the database by the received character as a retrieval key, or acquiring one or more candidate input information names stored in the database; displaying the acquired one or more candidate input information names on the display unit; and receiving a selection of an input information name from among the displayed one or more input information names via the input unit, and
wherein the control unit sets the determined input information name as the start point of the work flow.

15. The computer-implemented procedure generation method according to claim 13,
wherein the storage unit of the computer pre-stores a standard attribute value concerning the input information, associated with the input information name, and
wherein the control unit of the computer
receives an input of an attribute value concerning a candidate input information name as the start point of the work flow, via the input unit,
calculates a difference between the received attribute value and the pre-stored attribute value for each of the input information,
determines the input information name as the start point of the work flow, based on the difference, and
sets the determined input information name as the start point of the work flow.

16. The computer-implemented procedure generation method according to claim 13,
wherein the control unit of the computer
receives a selection of a work name from among the one or more displayed work names via the input unit, and
displays an input information name which is not displayed among one or more input information names associated with the selected work name, on the display unit.

17. The computer-implemented procedure generation method according to claim 13,
wherein the retrieved one or more work names and output information names are displayed on the display unit, in descending order of frequency so far selected.

18. The computer-implemented procedure generation method according to claim 13,
wherein the selected input information name, work name, and output information name are highlighted on the display unit, compared to any other names that are not selected.

19. The computer-implemented procedure generation method according to claim 13,
wherein the retrieved one or more input information names are displayed on the display unit in descending order of similarity, to the output information name used for retrieving the one or more input information names.

* * * * *